(12) United States Patent
Sun et al.

(10) Patent No.: US 9,031,155 B2
(45) Date of Patent: May 12, 2015

(54) METHOD AND APPARATUS FOR SENDING SIGNALS

(71) Applicant: Huawei Technologies Co., Ltd., Shenzhen, Guangdong (CN)

(72) Inventors: Guolin Sun, Shenzhen (CN); Xiangwei Zhou, Shenzhen (CN); Wei Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/946,320

(22) Filed: Jul. 19, 2013

(65) Prior Publication Data

US 2013/0308726 A1 Nov. 21, 2013

Related U.S. Application Data

(63) Continuation of application No. PCT/CN2011/080301, filed on Sep. 28, 2011.

(30) Foreign Application Priority Data

Jan. 21, 2011 (CN) .......................... 2011 1 0024052

(51) Int. Cl.
*H04L 27/00* (2006.01)
*H04L 27/26* (2006.01)
*H04L 5/00* (2006.01)

(52) U.S. Cl.
CPC ............ *H04L 27/2627* (2013.01); *H04L 5/003* (2013.01); *H04L 27/0006* (2013.01)

(58) Field of Classification Search
None
See application file for complete search history.

(56) References Cited

U.S. PATENT DOCUMENTS

| 2010/0054115 | A1* | 3/2010 | Roh et al. ...................... 370/208 |
| 2011/0149929 | A1* | 6/2011 | Kleider et al. ................ 370/338 |
| 2013/0065623 | A1* | 3/2013 | Gummadi et al. ............ 455/501 |
| 2013/0084821 | A1* | 4/2013 | Kapoor et al. ................ 455/307 |

FOREIGN PATENT DOCUMENTS

| CN | 101390356 A | 3/2009 |
| CN | 101568128 A | 10/2009 |

OTHER PUBLICATIONS

International Search Report in corresponding PCT Patent Application No. PCT/CN2011/080301 (Dec. 29, 2011).
Written Opinion of the International Searching Authority in corresponding PCT Patent Application No. PCT/CN2011/080301 (Dec. 29, 2011).

(Continued)

*Primary Examiner* — Adolf DSouza
(74) *Attorney, Agent, or Firm* — Leydig, Voit & Mayer, Ltd.

(57) ABSTRACT

A method and an apparatus for sending signals to suppress outband interference effectively in a simple way includes: grouping subcarriers in a spectrum into edge subcarriers of the spectrum and non-edge subcarriers of the spectrum; precoding data to be sent to obtain modulated symbols of the data on the subcarriers, where the precoding makes every two adjacent edge subcarriers of the spectrum in the edge subcarriers of the spectrum carry a pair of modulated symbols with opposite polarities, and makes each of the non-edge subcarriers of the spectrum carry a modulated symbol with no polarity; and sending the modulated symbols of the data on the subcarriers. The embodiments of the present invention are applicable to a signal sending process.

16 Claims, 2 Drawing Sheets

(56) References Cited

OTHER PUBLICATIONS

Shelby et al., "Modified Adjacent Frequency Coding for Increased Notch Depth in MB-OFDM under DAA/Spectral Sculpting," 2006, IEEE, New York, New York.

Wylie-Green, Marilynn, "Adjacent Frequency Coding Technique for Decreasing MB-OFDM UWB Interference to Other Radio Services," 2006, IEEE, New York, New York.

Liu et al., "OFDM Subcarriers Coding for Enhancing Spectrum Notch," 2008, IEEE, New York, New York.

Marey et al., "A New Algorithm for Sidelobe Suppression and Performance Comparison in DFT-OFDM," 2010, IEEE, New York, New York.

Zhou et al., "Low-Complexity Spectrum Shaping for OFDM-based Cognitive Radios," 2011, IEEE, New York, New York.

Extended European Search Report in corresponding European Patent Application No. 11856395.6 (Nov. 28, 2013).

* cited by examiner

METHOD AND APPARATUS FOR SENDING SIGNALS

CROSS-REFERENCE TO RELATED APPLICATIONS

This application is a continuation of International Patent Application No. PCT/CN2011/080301, filed on Sep. 28, 2011, which claims priority to Chinese Patent Application No. 201110024052.9, filed on Jan. 21, 2011, both of which are hereby incorporated by reference in their entireties.

FIELD OF TECHNOLOGY

The present invention relates to the communication field, and in particular, to a method and an apparatus for sending signals.

BACKGROUND OF THE INVENTION

CR (Cognitive Radio) is a method for overcoming spectrum resource shortage effectively in the prior art. Through spectrum sensing, the CR technology obtains and accesses unused authorized bands on a precondition that no intra-frequency interference is caused to authorized users and the adjacent-frequency interference is not too high. OFDM (Orthogonal Frequency Division Multiplexing) simply and efficiently suppresses ISI (Inter-Symbol Interference) caused by channel time dispersion and implements high-speed data transmission. The OFDM technology divides a signal bandwidth that suffers selective fading of channel frequency into several mutually orthogonal subcarriers with flat fading, and reduces complexity of signal detection on the receiver; the number of subcarriers may be changed to obtain different bandwidths and adapt to variable-bandwidth operations; the subcarriers are allocated to different users, and multi-user access is implemented in an OFDMA mode, and even OFDM transmission can be implemented on discontinuous bands. However, the OFDM is defective in slow attenuation of outband radiation, and causes great outband interference to authorized users.

There are two methods for overcoming the outband interference in the prior art. The first method is to use AIC (Active Interference Cancellation) and AST (Adaptive Symbol Transition) to calculate current transmitted data blocks, and insert interference cancellation subcarriers or symbol extensions to suppress outband interference, but this method is too complicated because it requires calculation of each data block. The second method is to apply subcarrier weighting, namely, multiply the OFDM subcarrier by a corresponding weighting factor directly to suppress outband interference, but the calculation load is too heavy in this method because the current weighting factor needs to be worked out according to each data block respectively.

The methods for suppressing outband interference in the prior art can suppress outband interference to some extent, but are very complicated and require a heavy load of calculation.

SUMMARY OF THE INVENTION

Embodiments of the present invention provide a method and an apparatus for sending signals to suppress outband interference effectively in a simple way.

The embodiments of the present invention are based on the following technical solutions:

A method for sending signals includes:

grouping subcarriers in a spectrum into edge subcarriers of the spectrum and non-edge subcarriers of the spectrum;

precoding data to be sent to obtain modulated symbols of the data on the subcarriers, where the precoding makes every two adjacent edge subcarriers of the spectrum in the edge subcarriers of the spectrum carry a pair of modulated symbols with opposite polarities, and makes each of the non-edge subcarriers of the spectrum carry a modulated symbol with no polarity; and sending the modulated symbols of the data on the subcarriers.

An apparatus for sending signals includes:

a grouping unit, configured to group subcarriers in a spectrum into edge subcarriers of the spectrum and non-edge subcarriers of the spectrum;

a precoding unit, configured to precode data to be sent to obtain modulated symbols of the data on the subcarriers, where the precoding makes every two adjacent edge subcarriers of the spectrum in the edge subcarriers of the spectrum carry a pair of modulated symbols with opposite polarities, and makes each of the non-edge subcarriers of the spectrum carry a modulated symbol with no polarity; and a sending unit, configured to send the modulated symbols of the data on the subcarriers.

Compared with the prior art, the technical solutions provided by the embodiments of the present invention group the subcarriers in a spectrum into edge subcarriers and non-edge subcarriers of the spectrum, make every two adjacent edge subcarriers of the spectrum in the edge subcarriers of the spectrum carry a pair of modulated symbols with opposite polarities, and make each of the non-edge subcarriers of the spectrum carry a modulated symbol with no polarity, thereby implementing self suppression of outband interference of edge subcarriers and suppressing the outband interference effectively in a simple way.

BRIEF DESCRIPTION OF THE DRAWINGS

To make the technical solutions of the embodiments of the present invention or the prior art more comprehensible, the following outlines the accompanying drawings used in the description of the embodiments of the present invention or the prior art. Apparently, the accompanying drawings outlined below are illustrative rather than exhaustive, and persons of ordinary skill in the art can derive other drawings from them without any creative effort.

DETAILED DESCRIPTION OF THE EMBODIMENTS

The following detailed description is given in conjunction with the accompanying drawings in the embodiments of the present invention to provide a clear and thorough understanding of the technical, solutions in the embodiments of the present invention. Evidently, the drawings and the detailed description are merely representative of particular embodiments of the present invention rather than all embodiments.

Embodiment 1

Figure 1:
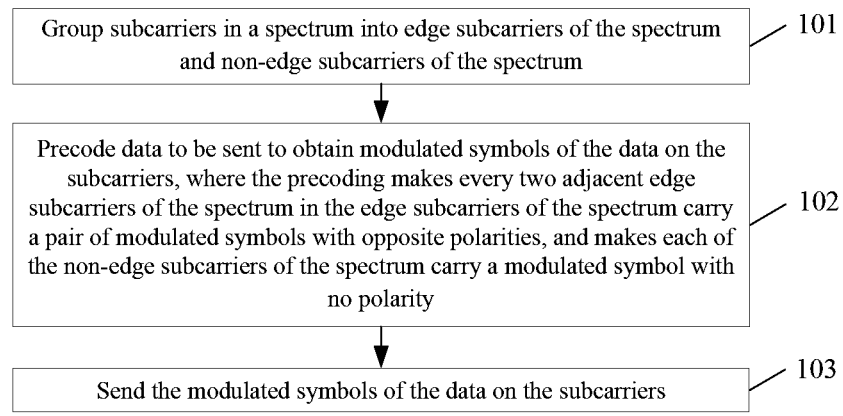
FIG. 1 is a flowchart of a signal sending method according to Embodiment 1 of the present invention.

This embodiment of the present invention provides a signal sending method. As shown in FIG. 1, the method includes the following steps:

101. Group subcarriers in a spectrum into edge subcarriers of the spectrum and non-edge subcarriers of the spectrum.

Grouping the subcarriers in the spectrum into edge subcarriers of the spectrum and non-edge subcarriers of the spectrum includes:

if the spectrum is continuous, grouping subcarriers in the continuous spectrum into edge subcarriers of the spectrum and non-edge subcarriers of the spectrum; or if the spectrum is discontinuous, grouping subcarriers in each band of the discontinuous spectrum into edge subcarriers of the spectrum and non-edge subcarriers of the spectrum respectively.

Grouping the subcarriers in the spectrum into edge subcarriers of the spectrum and non-edge subcarriers of the spectrum includes:

letting a first number of subcarriers at edge of the spectrum be edge subcarriers of the spectrum, and letting subcarriers other than the edge subcarriers in the spectrum be non-edge subcarriers of the spectrum, where the first number is defined to accomplish a tradeoff between data throughput and outband interference suppression capability, in which the first number is an empiric value. When the first number of subcarriers at edge of the spectrum are defined as the edge subcarriers of the spectrum, the outband interference is suppressed effectively, and the data throughput is improved as well.

Understandably, the outband interference is primarily caused by the data transmitted over the edge subcarriers of the spectrum. The embodiment of the present invention makes every two adjacent edge subcarriers of the spectrum in the edge subcarriers of the spectrum carry a pair of modulated symbols with opposite polarities to implement self suppression of outband interference of the edge subcarriers. Therefore, with more edge subcarriers of the spectrum, the capability of suppressing outband interference is higher. Two subcarriers in the edge subcarriers of the spectrum carry only one modulated symbol, which leads to a low data throughput; conversely, with less edge subcarriers of the spectrum, the data throughput is higher, but the capability of suppressing outband interference is lower. Therefore, at the time of grouping the subcarriers in the spectrum that bears the data to be sent into edge subcarriers of the spectrum and non-edge subcarriers of the spectrum, the ratio of the number of the edge subcarriers to the number of the non-edge subcarriers of the spectrum may be adjusted flexibly to fulfill the user requirement of flexible adjustment between the outband interference suppression intensity and the data throughput. The adjustment includes:

For the purpose of increasing the data throughput, letting less than the first number of subcarriers at the edge of the spectrum be edge subcarriers of the spectrum, and letting subcarriers other than the edge subcarriers in the spectrum be non-edge subcarriers of the spectrum; and For the purpose of increasing the outband interference suppression capability, letting more than the first number of subcarriers at the edge of the spectrum be edge subcarriers of the spectrum, and letting subcarriers other than the edge subcarriers in the spectrum be non-edge subcarriers of the spectrum.

102. Precode data to be sent to obtain modulated symbols of the data on the subcarriers, where the precoding makes every two adjacent edge subcarriers of the spectrum in the edge subcarriers of the spectrum carry a pair of modulated symbols with opposite polarities, and makes each of the non-edge subcarriers of the spectrum carry a modulated symbol with no polarity.

Figure 2:
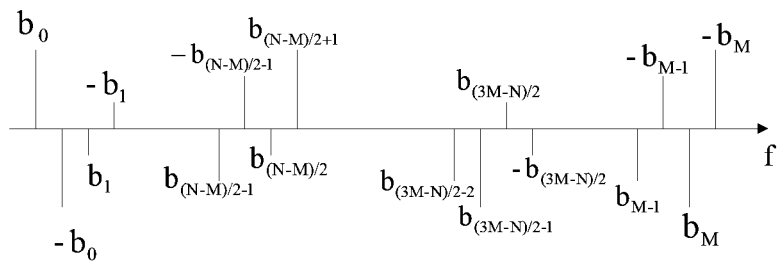
FIG. 2 is a schematic diagram of a precoding method according to Embodiment 1 of the present invention.

Specifically, the precoding method is illustrated in FIG. 2. In FIG. 2, each position represents a subcarrier, and each piece of data represents a modulated symbol on the subcarrier. For example, subcarriers $b_0$ to $-b_{(N-M)/2-1}$ and subcarriers $b_{(3M-N)/2}$ to $-b_M$ in the subcarriers of the spectrum are defined as edge subcarriers of the spectrum; and subcarriers $b_{(N-M)/2}$ to $b_{(3M-N)/2-1}$ in the subcarriers of the spectrum are defined as non-edge subcarriers of the spectrum. Every two adjacent edge subcarriers of the spectrum in the edge subcarriers of the spectrum carry a pair of modulated symbols with opposite polarities, such as $b_0$ and $-b_0$, $b_M$ and $-b_M$, and so on; each of the non-edge subcarriers of the spectrum carries a modulated symbol with no polarity, such as $b_{(N-M)/2}$, $b_{(N-M)/2+1}$, $b_{(3M-N)/-1}$, and so on.

Besides, the coding method may be expressed by a matrix such as matrix G. The matrix G is:

$$G = \begin{bmatrix} G_e & 0 & 0 \\ 0 & I & 0 \\ 0 & 0 & G_e \end{bmatrix},$$

where

I is a unit matrix and represents non-edge subcarriers of the spectrum, where the non-edge subcarriers of the spectrum are modulated in a traditional OFDM mode; $G_e$ represents edge subcarriers of the spectrum. Every two adjacent edge subcarriers of the spectrum in the edge subcarriers of the spectrum carry a pair of modulated symbols with opposite polarities. Specifically, $G_e$ is:

$$G_e = \begin{bmatrix} 1 & & & & \\ -1 & 1 & & & \\ & -1 & \ddots & & \\ & & & \ddots & 1 \\ & & & & -1 \end{bmatrix}$$

103. Send the modulated symbols of the data on the subcarriers.

In the embodiments of the present invention, the subcarriers in a spectrum are grouped into edge subcarriers and non-edge subcarriers of the spectrum, every two adjacent edge subcarriers of the spectrum in the edge subcarriers of the spectrum carry a pair of modulated symbols with opposite polarities, and each of the non-edge subcarriers of the spectrum carries a modulated symbol with no polarity, thereby implementing self suppression of outband interference of edge subcarriers and suppressing the outband interference effectively in a simple way.

Moreover, in the embodiments of the present invention, every two adjacent edge subcarriers of the spectrum in the edge subcarriers of the spectrum carry a pair of modulated symbols with opposite polarities to implement self suppression of outband interference of edge subcarriers. Therefore, at the time of transmitting data over the edge subcarriers, it is not necessary to reduce the transmit power, and the data may even be transmitted at a power higher than the transmit power of the non-edge subcarriers. Therefore, the user can adjust the amount of transmit power of the edge subcarriers and non-edge subcarriers of the spectrum as required.

Further, in the embodiments of the present invention, at the time of grouping the subcarriers in the spectrum into edge subcarriers of the spectrum and non-edge subcarriers of the spectrum, the ratio of the number of the edge subcarriers to the number of the non-edge subcarriers of the spectrum may be adjusted flexibly as required by the user to fulfill the user requirement of flexible adjustment between the outband interference suppression intensity and the data throughput.

Embodiment 2

Figure 3:
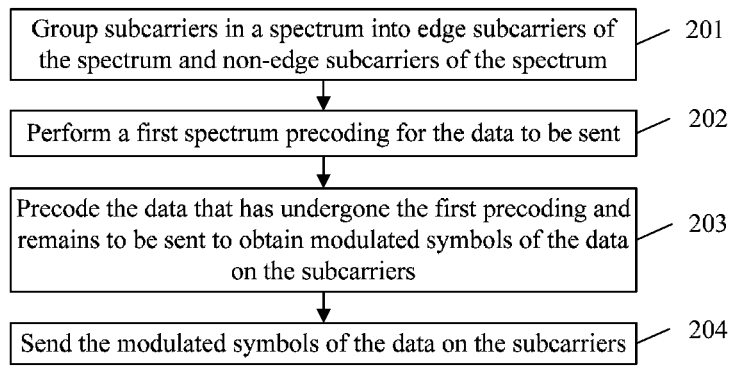
FIG. 3 is a signal sending flowchart according to Embodiment 2 of the present invention.

This embodiment of the present invention provides a signal sending method. As shown in FIG. 3, the method includes the following steps:

201. Group subcarriers in a spectrum into edge subcarriers of the spectrum and non-edge subcarriers of the spectrum.

For the details of grouping the subcarriers in the spectrum into edge subcarriers of the spectrum and non-edge subcarriers of the spectrum, see the description in step 101 in Embodiment 1 without any redundant explanation here.

202. Perform a first spectrum precoding for the data to be sent.

The first spectrum precoding for the data to be sent may be implemented in the following way:

Perform a first spectrum precoding for the non-edge subcarriers of the spectrum, or perform a first spectrum precoding for the edge subcarriers and non-edge subcarriers of the spectrum, where the first spectrum precoding suppresses outband interference. Any spectrum precoding method for suppressing outband interference in the prior art may be used to perform the first spectrum precoding for the non-edge subcarriers of the spectrum or perform the first spectrum precoding for the edge subcarriers and non-edge subcarriers of the spectrum. This embodiment of the present invention does not restrict the spectrum precoding method for suppressing outband interference. For example, the method may be a spectrum precoding method that applies subcarrier weighting.

203. Precode the data that has undergone the first precoding and remains to be sent to obtain modulated symbols of the data on the subcarriers.

For details of precoding the data that has undergone the first precoding and remains to be sent, see the description in step 102 in Embodiment 1 without any redundant explanation here, but the difference is: This embodiment of the present invention uses a coding mode for suppressing outband interference in the prior art to precode the data to be sent.

204. Send the modulated symbols of the data on the subcarriers.

In the embodiments of the present invention, the subcarriers in a spectrum are grouped into edge subcarriers and non-edge subcarriers of the spectrum, every two adjacent edge subcarriers of the spectrum in the edge subcarriers of the spectrum carry a pair of modulated symbols with opposite polarities, and each of the non-edge subcarriers of the spectrum carries a modulated symbol with no polarity, thereby implementing self suppression of outband interference of edge subcarriers and suppressing the outband interference effectively in a simple way.

Moreover, in the embodiments of the present invention, every two adjacent edge subcarriers of the spectrum in the edge subcarriers of the spectrum carry a pair of modulated symbols with opposite polarities to implement self suppression of outband interference of edge subcarriers. Therefore, at the time of transmitting data over the edge subcarriers, it is not necessary to reduce the transmit power, and the data may even be transmitted at a power higher than the transmit power of the non-edge subcarriers. Therefore, the user can adjust the amount of transmit power of the edge subcarriers and non-edge subcarriers of the spectrum as required.

Further, in the embodiments of the present invention, at the time of grouping the subcarriers in the spectrum into edge subcarriers of the spectrum and non-edge subcarriers of the spectrum, the ratio of the number of the edge subcarriers to the number of the non-edge subcarriers of the spectrum may be adjusted flexibly as required by the user to fulfill the user requirement of flexible adjustment between the outband interference suppression intensity and the data throughput.

Further still, in the embodiments of the present invention, before the data to be sent is precoded, any precoding mode for suppressing outband interference in the prior art may be used to encode the data to be sent, and then the encoded data to be sent is precoded. The data to be sent is precoded twice to improve the intensity of suppressing outband interference.

Embodiment 3

Figure 4:
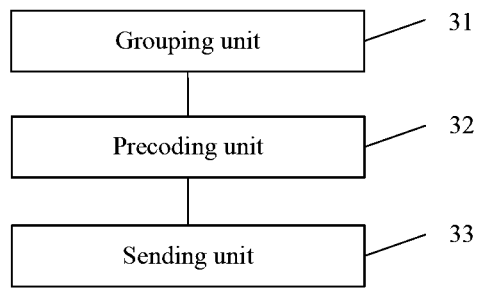
FIG. 4 is a signal sending block diagram according to Embodiment 3 of the present invention.

This embodiment of the present invention provides a signal sending apparatus. The apparatus is applied in a CR system to implement the method described in the preceding embodiment. The apparatus is capable of implementing all steps and functions in the foregoing method embodiment completely. As shown in FIG. 4, the apparatus includes: a grouping unit 31, a precoding unit 32, and a sending unit 33.

The grouping unit 31 is configured to group subcarriers in a spectrum into edge subcarriers of the spectrum and non-edge subcarriers of the spectrum;

The precoding unit 32 is configured to precode data to be sent to obtain modulated symbols of the data on the subcarriers, where the precoding makes every two adjacent edge subcarriers of the spectrum in the edge subcarriers of the spectrum carry a pair of modulated symbols with opposite polarities, and makes each of the non-edge subcarriers of the spectrum carry a modulated symbol with no polarity; and The sending unit 33 is configured to send the modulated symbols of the data on the subcarriers.

Figure 5:
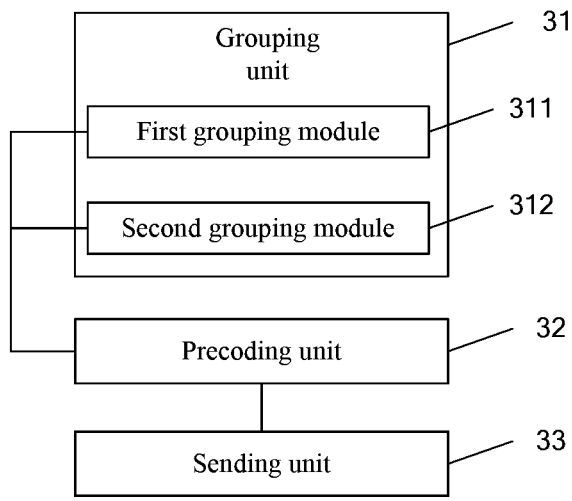
FIG. 5 is another signal sending block diagram according to Embodiment 3 of the present invention.

As shown in FIG. 5, the grouping unit 31 includes a first grouping module 311 or a second grouping module 312.

The first grouping module 311 is configured to group subcarriers in a continuous spectrum into edge subcarriers of the spectrum and non-edge subcarriers of the spectrum if the spectrum is continuous.

The second grouping module 312 is configured to group subcarriers in each band of a discontinuous spectrum into edge subcarriers of the spectrum and non-edge subcarriers of the spectrum respectively if the spectrum is discontinuous.

The mode of grouping the subcarriers in the spectrum into edge subcarriers of the spectrum and non-edge subcarriers of the spectrum includes: letting a first number of subcarriers at edge of the spectrum be edge subcarriers of the spectrum, and letting subcarriers other than the edge subcarriers in the spectrum be non-edge subcarriers of the spectrum, where the first number is defined to accomplish a tradeoff between data throughput and outband interference suppression capability. The first number is an empiric value. When the subcarriers amounting to the preset number threshold in the spectrum are defined as the edge subcarriers of the spectrum, the outband interference is suppressed effectively, and the data throughput is improved as well.

Understandably, the outband interference is primarily caused by the data transmitted over the edge subcarriers of the spectrum. This embodiment of the present invention makes every two adjacent edge subcarriers of the spectrum in the edge subcarriers of the spectrum carry a pair of modulated symbols with opposite polarities to implement self suppression of outband interference of the edge subcarriers. Therefore, with more edge subcarriers of the spectrum, the capability of suppressing outband interference is higher. Two subcarriers in the edge subcarriers of the spectrum carry only one modulated symbol, which leads to a low data throughput; conversely, with less edge subcarriers of the spectrum, the data throughput is higher, but the capability of suppressing outband interference is lower. Therefore, at the time of grouping the subcarriers in the spectrum that bears the data to be sent into edge subcarriers of the spectrum and non-edge subcarriers of the spectrum, the ratio of the number of the edge subcarriers to the number of the non-edge subcarriers of the spectrum may be adjusted flexibly to fulfill the user requirement of flexible adjustment between the outband interference suppression intensity and the data throughput. At the time of adjusting the relationship between the outband interference suppression intensity and the data throughput, the grouping unit 31 is further configured to:

For the purpose of increasing the data throughput, let less than the first number of subcarriers at the edge of the spectrum be edge subcarriers of the spectrum, and let subcarriers other than the edge subcarriers in the spectrum be non-edge subcarriers of the spectrum; and For the purpose of increasing the outband interference suppression capability, let more than the first number of subcarriers at the edge of the spectrum be edge subcarriers of the spectrum, and let subcarriers other than the edge subcarriers in the spectrum be non-edge subcarriers of the spectrum.

Figure 6:
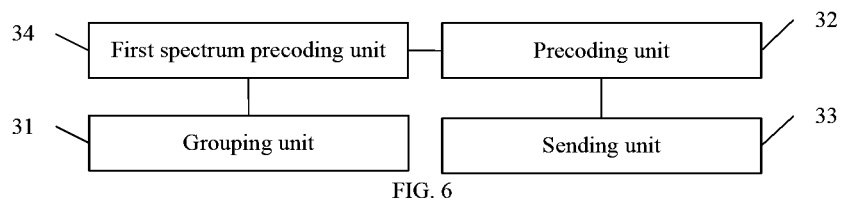
FIG. 6 is another signal sending block diagram according to Embodiment 3 of the present invention.

Further, as shown in FIG. 6, to increase the outband interference suppression intensity, the apparatus further includes: a first spectrum precoding unit 34.

The first spectrum precoding unit 34 is configured to: before the precoding unit 32 precodes the data to be sent to obtain the modulated symbols of the data on the subcarriers, perform a first spectrum precoding for the non-edge subcarriers of the spectrum, or perform a first spectrum precoding for the edge subcarriers and non-edge subcarriers of the spectrum, where the first spectrum precoding suppresses outband interference.

The first spectrum precoding unit 34 may use any spectrum precoding method for suppressing outband interference in the prior art to perform the first spectrum precoding for the non-edge subcarriers of the spectrum or perform the first spectrum precoding for the edge subcarriers and non-edge subcarriers of the spectrum. This embodiment of the present invention does not restrict the spectrum precoding method for suppressing outband interference. For example, the method may be a spectrum precoding method that applies subcarrier weighting.

In the embodiments of the present invention, the subcarriers in a spectrum are grouped into edge subcarriers and non-edge subcarriers of the spectrum, every two adjacent edge subcarriers of the spectrum in the edge subcarriers of the spectrum carry a pair of modulated symbols with opposite polarities, and each of the non-edge subcarriers of the spectrum carries a modulated symbol with no polarity, thereby implementing self suppression of outband interference of edge subcarriers and suppressing the outband interference effectively in a simple way.

Moreover, in the embodiments of the present invention, every two adjacent edge subcarriers of the spectrum in the edge subcarriers of the spectrum carry a pair of modulated symbols with opposite polarities to implement self suppression of outband interference of edge subcarriers. Therefore, at the time of transmitting data over the edge subcarriers, it is not necessary to reduce the transmit power, and the data may even be transmitted at a power higher than the transmit power of the non-edge subcarriers. Therefore, the user can adjust the amount of transmit power of the edge subcarriers and non-edge subcarriers of the spectrum as required.

Further, in the embodiments of the present invention, at the time of grouping the subcarriers in the spectrum into edge subcarriers of the spectrum and non-edge subcarriers of the spectrum, the ratio of the number of the edge subcarriers to the number of the non-edge subcarriers of the spectrum may be adjusted flexibly as required by the user to fulfill the user requirement of flexible adjustment between the outband interference suppression intensity and the data throughput.

Further still, in the embodiments of the present invention, before the data to be sent is precoded, any precoding mode for suppressing outband interference in the prior art may be used to encode the data to be sent, and then the encoded data to be sent is precoded. The data to be sent is precoded twice to improve the intensity of suppressing outband interference.

Through the description in the embodiments above, those skilled in the art are clearly aware that the embodiments of the present invention may be implemented through hardware only, or preferably, through software in addition to necessary universal hardware. Therefore, the essence of the technical solutions of the present invention or contribution to the prior art may be embodied in a software product. The software product is stored in a computer-readable storage medium such as computer floppy disk, hard disk and CD-ROM, and incorporates several instructions causing a computer device (for example, personal computer, server, or network device) to execute the method specified in any embodiment of the present invention.

The above descriptions are merely preferred embodiments of the present invention, but not intended to limit the protection scope of the present invention. Any modifications, variations or replacement that can be easily derived by those skilled in the art without departing from the spirit of the present invention shall fall within the protection scope of the present invention. Therefore, the protection scope of the present invention is subject to the appended claims.

What is claimed is:

1. A signal sending method, implemented by a signal sending apparatus, comprising:
   grouping subcarriers in a spectrum into edge subcarriers of the spectrum and non-edge subcarriers of the spectrum;
   precoding data to be sent to obtain modulated symbols of the data on the subcarriers, so that every two adjacent edge subcarriers of the spectrum in the edge subcarriers of the spectrum carry a pair of modulated symbols with opposite polarities, and each of the non-edge subcarriers of the spectrum carries a modulated symbol with no polarity, wherein the pair of modulated symbols with the opposite polarities is obtained from one single symbol, and a first modulated symbol of the pair is equal to the single symbol, while a second symbol of the pair is equal to the single symbol affected by a −1 factor, and the modulated symbol with no polarity is a modulated symbol without being affected by a −1 factor; and
   sending the modulated symbols of the data on the subcarriers.

2. The method according to claim 1, wherein the grouping the subcarriers in the spectrum into the edge subcarriers of the spectrum and the non-edge subcarriers of the spectrum comprises:

if the spectrum is continuous, grouping subcarriers in the continuous spectrum into the edge subcarriers of the spectrum and the non-edge subcarriers of the spectrum; or if the spectrum is discontinuous, grouping subcarriers in each band of the discontinuous spectrum into the edge subcarriers of the spectrum and the non-edge subcarriers of the spectrum respectively.

3. The method according to claim 1, wherein the grouping the subcarriers in the spectrum into the edge subcarriers of the spectrum and the non-edge subcarriers of the spectrum comprises:

setting a number of subcarriers at an edge of the spectrum as the edge subcarriers of the spectrum, and setting subcarriers other than the edge subcarriers in the spectrum as the non-edge subcarriers of the spectrum, wherein the number is defined to accomplish a tradeoff between data throughput and outband interference suppression capability.

4. The method according to claim 2, wherein the grouping the subcarriers in the spectrum into the edge subcarriers of the spectrum and the non-edge subcarriers of the spectrum comprises:

setting a number of subcarriers at an edge of the spectrum as the edge subcarriers of the spectrum, and setting subcarriers other than the edge subcarriers in the spectrum as the non-edge subcarriers of the spectrum, wherein the number is defined to accomplish a tradeoff between data throughput and outband interference suppression capability.

5. The method according to claim 1, wherein the grouping the subcarriers in the spectrum into the edge subcarriers of the spectrum and the non-edge subcarriers of the spectrum comprises:

setting less than a number of subcarriers at an edge of the spectrum as the edge subcarriers of the spectrum to increase the data throughput, and setting subcarriers other than the edge subcarriers in the spectrum as the non-edge subcarriers of the spectrum.

6. The method according to claim 2, wherein the grouping the subcarriers in the spectrum into the edge subcarriers of the spectrum and the non-edge subcarriers of the spectrum comprises:

setting less than a number of subcarriers at an edge of the spectrum as the edge subcarriers of the spectrum to increase the data throughput, and setting subcarriers other than the edge subcarriers in the spectrum as the non-edge subcarriers of the spectrum.

7. The method according to claim 1, wherein the grouping the subcarriers in the spectrum into the edge subcarriers of the spectrum and the non-edge subcarriers of the spectrum comprises:

setting more than a number of subcarriers at an edge of the spectrum as the edge subcarriers of the spectrum to enhance the outband interference suppression capability, and setting subcarriers other than the edge subcarriers in the spectrum as the non-edge subcarriers of the spectrum.

8. The method according to claim 2, the grouping the subcarriers in the spectrum into the edge subcarriers of the spectrum and the non-edge subcarriers of the spectrum comprises:

setting more than a number of subcarriers at an edge of the spectrum as the edge subcarriers of the spectrum to enhance the outband interference suppression capability, and setting subcarriers other than the edge subcarriers in the spectrum as the non-edge subcarriers of the spectrum.

9. A signal sending apparatus, comprising:

a grouping unit, configured to group subcarriers in a spectrum into edge subcarriers of the spectrum and non-edge subcarriers of the spectrum;

a precoding unit, configured to precode data to be sent to obtain modulated symbols of the data on the subcarriers, so that every two adjacent edge subcarriers of the spectrum in the edge subcarriers of the spectrum carry a pair of modulated symbols with opposite polarities, and each of the non-edge subcarriers of the spectrum carries a modulated symbol with no polarity, wherein the pair of modulated symbols with the opposite polarities is obtained from one single symbol, and a first modulated symbol of the pair is equal to the single symbol, while a second symbol of the pair is equal to the single symbol affected by a −1 factor, and the modulated symbol with no polarity is a modulated symbol without being affected by a −1 factor; and a sending unit, configured to send the modulated symbols of the data on the subcarriers.

10. The apparatus according to claim 9, wherein the grouping unit comprises one of:

a first grouping module, configured to group subcarriers in a continuous spectrum into the edge subcarriers of the spectrum and the non-edge subcarriers of the spectrum if the spectrum is continuous; and a second grouping module, configured to group subcarriers in each band of a discontinuous spectrum into the edge subcarriers of the spectrum and the non-edge subcarriers of the spectrum respectively if the spectrum is discontinuous.

11. The apparatus according to claim 9, wherein the grouping unit is configured to set a number of subcarriers at an edge of the spectrum as the edge subcarriers of the spectrum, and set subcarriers other than the edge subcarriers in the spectrum as the non-edge subcarriers of the spectrum, wherein the number is defined to accomplish a tradeoff between data throughput and outband interference suppression capability.

12. The apparatus according to claim 10, wherein the grouping unit is configured to set a number of subcarriers at an edge of the spectrum as the edge subcarriers of the spectrum, and set subcarriers other than the edge subcarriers in the spectrum as the non-edge subcarriers of the spectrum, wherein the number is defined to accomplish a tradeoff between data throughput and outband interference suppression capability.

13. The apparatus according to claim 11, wherein the grouping unit is further configured to set less than the number of subcarriers at the edge of the spectrum as the edge subcarriers of the spectrum to increase the data throughput.

14. The apparatus according to claim 12, wherein the grouping unit is further configured to set less than the number of subcarriers at the edge of the spectrum as the edge subcarriers of the spectrum to increase the data throughput.

15. The apparatus according to claim 11, wherein the grouping unit is further configured to set more than the number of subcarriers at the edge of the spectrum as the edge subcarriers of the spectrum to enhance the outband interference suppression capability.

16. The apparatus according to claim 12, wherein the grouping unit is further configured to set more than the number of subcarriers at the edge of the spectrum as the edge subcarriers of the spectrum to enhance the outband interference suppression capability.

* * * * *